United States Patent
Su

(10) Patent No.: US 8,300,747 B2
(45) Date of Patent: Oct. 30, 2012

(54) METHOD AND SYSTEM FOR AN ADAPTIVE VBLAST RECEIVER FOR WIRELESS MULTIPLE INPUT MULTIPLE OUTOUT (MIMO) DETECTION

(75) Inventor: Ling Su, Cupertino, CA (US)

(73) Assignee: Broadcom Corporation, Irvine, CA (US)

(*) Notice: Subject to any disclaimer, the term of this patent is extended or adjusted under 35 U.S.C. 154(b) by 283 days.

(21) Appl. No.: 12/763,670

(22) Filed: Apr. 20, 2010

(65) Prior Publication Data
US 2010/0202573 A1    Aug. 12, 2010

Related U.S. Application Data

(63) Continuation of application No. 11/356,685, filed on Feb. 17, 2006, now Pat. No. 7,702,050.

(51) Int. Cl.
*H04B 7/10*    (2006.01)

(52) U.S. Cl. .................................................. 375/347
(58) Field of Classification Search ........... 375/347–349
See application file for complete search history.

(56) References Cited

U.S. PATENT DOCUMENTS 5,202,903 A * 4/1993 Okanoue ..................... 375/347
* cited by examiner

*Primary Examiner* — Kevin Kim
(74) *Attorney, Agent, or Firm* — Garlick & Markison; Edward J. Marshall

(57) ABSTRACT

Various aspects of a system for an adaptive VBLAST receiver for wireless MIMO detection may comprise utilizing log likelihood ratios (LLR) to selectively cancel interference in a received signal when information contained in one or more layers is encoded. Following the selective cancellation of interference, further computations may be performed on the residual received signal. Various aspects of the invention may comprise a linear detector with improved performance in comparison to some conventional VBLAST receivers. Performance may be measured by, for example, a packet error rate (PER) for a given signal to noise ratio (SNR) associated with the received signal.

32 Claims, 7 Drawing Sheets

METHOD AND SYSTEM FOR AN ADAPTIVE VBLAST RECEIVER FOR WIRELESS MULTIPLE INPUT MULTIPLE OUTOUT (MIMO) DETECTION

CROSS-REFERENCE TO RELATED APPLICATIONS/INCORPORATION BY REFERENCE

This application is a continuation of U.S. patent application Ser. No. 11/356,685 filed Feb. 17, 2006.

This application makes reference to U.S. patent application Ser. No. 11/350,419 filed Feb. 9, 2006.

FIELD OF THE INVENTION

Certain embodiments of the invention relate to wireless communications. More specifically, certain embodiments of the invention relate to a method and system for an adaptive VBLAST receiver for wireless multiple input multiple output (MIMO) detection.

BACKGROUND OF THE INVENTION

In a conventional vertical Bell Laboratories layered space time (VBLAST) receiver, a received plurality of layers may be sorted in order based upon a SNR for the corresponding layer. A layer may refer to one of a plurality of modulated, information-carrying signals that may be transmitted by a MIMO transmitter. A layer may also be referred to as a spatial stream. A current spatial stream may comprise a current SNR whose value is greater than or equal to a subsequent SNR that is associated with a subsequent spatial stream. A difference between a current layer received symbol and an estimated current layer received symbol may comprise a current layer error. After cancellation of the estimated current layer received symbol from a received signal comprising the received plurality of spatial streams, a current layer residual signal may be generated. The current layer residual signal may comprise the current layer error. A difference between a subsequent layer received symbol and an estimated subsequent layer received symbol may comprise a subsequent layer error. After cancelling of a previous layer, a linear equalization (zero forcing, or MMSE) solution may be utilized on the dimension reduced new system after removing the interference from the already detected layer.

The complexity of a conventional VBLAST receiver may increase linearly as the number of antenna utilized by a MIMO transmitter, in transmitting a signal via a MIMO channel, increases. However, in a conventional VBLAST receiver, an error in a current layer may propagate to a subsequent layer. Consequently, the subsequent layer error may be greater in the presence of the current layer error that propagates to the subsequent layer than may be the case if the current layer error did not propagate to the subsequent layer. This trend of increasing layer errors may continue in succeeding layers. Reduced SNR performance and/or increased PER may result from error propagation in some conventional VBLAST receivers that receive and/or process a received signal comprising a received plurality of spatial streams, that further comprise a corresponding plurality of received symbols.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for an adaptive VBLAST receiver for wireless multiple input multiple output (MIMO) detection, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for an adaptive vertical Bell Laboratories layered space-time (VBLAST) receiver for wireless multiple input multiple output (MIMO) detection. A MIMO signal may comprise a plurality of signals transmitted by a corresponding plurality of antennas located in a MIMO transmitting system. Each of the plurality of signals may be referred to as a layer. MIMO detection may comprise detecting information contained in each layer of the MIMO signal. Various embodiments of the invention may utilize statistical analytical methods to reduce communications errors between a transmitter and a receiver communicating via an RF channel by avoiding error propagation when detecting information contained in each layer sequentially.

In some conventional MIMO systems information contained in a layer may be encoded. Encoding may be utilized to enable detection and/or correction of errors that may occur when the MIMO signal is transmitted via a wireless communication medium between a MIMO transmitter and a MIMO receiver. Various aspects of a system for an adaptive VBLAST receiver for wireless MIMO detection may selectively cancel interference in a received signal. Following the selective cancellation of interference, further computations may be performed on the residual received signal. Various embodiments of the invention may comprise a linear detector with improved performance in comparison to some conventional VBLAST receivers. Performance may be measured by, for example, a packet error rate (PER) for a given signal to noise ratio (SNR) associated with the received signal.

Figure 1:
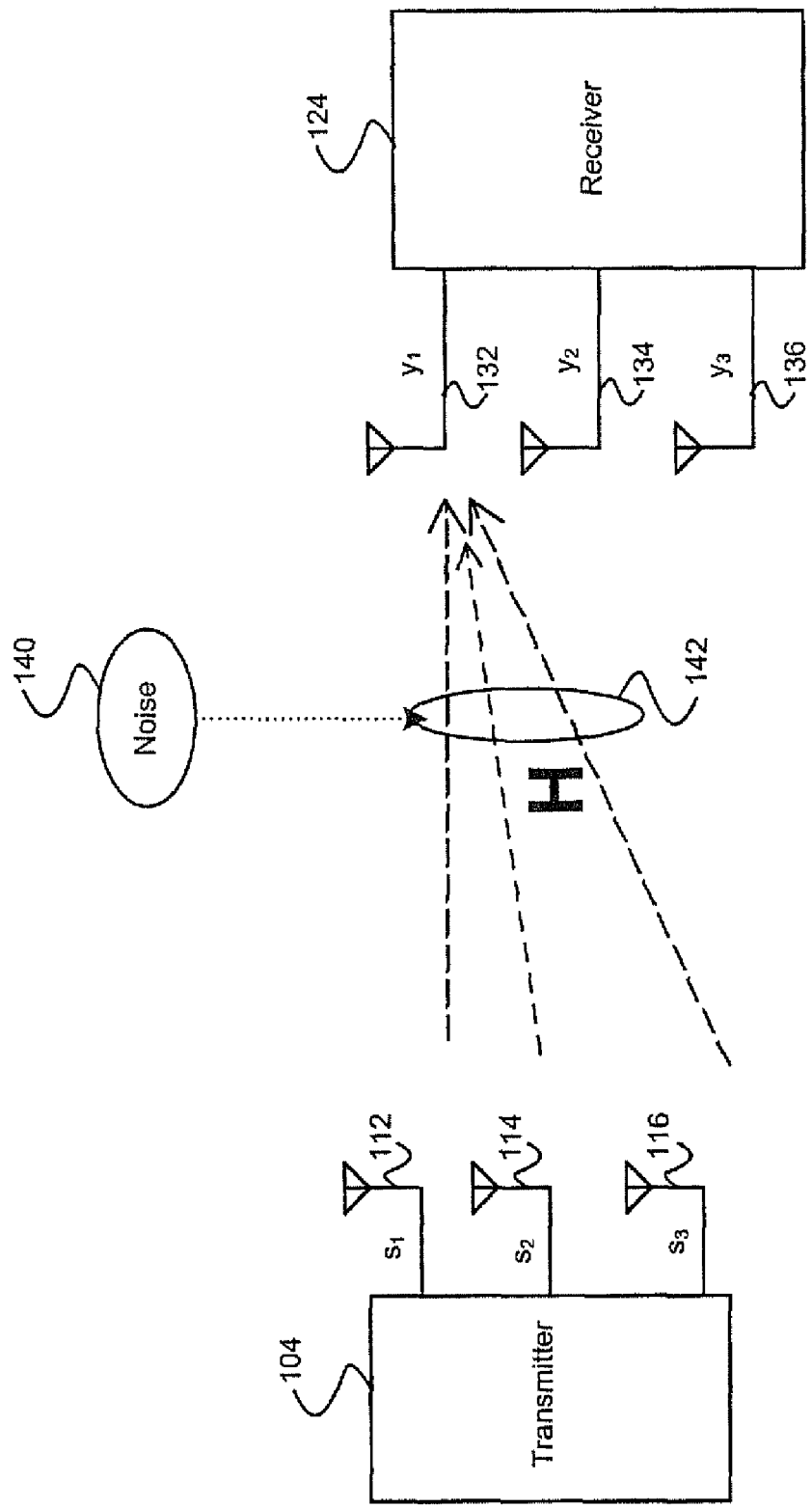
FIG. 1 is a block diagram illustrating an exemplary multiple input multiple output (MIMO) communications system that may be utilized in connection with an embodiment of the invention.

FIG. 1 is a block diagram illustrating an exemplary multiple input multiple output (MIMO) communications system that may be utilized in connection with an embodiment of the invention. Referring to FIG. 1 there is shown a transmitting mobile terminal 104, a plurality of transmitting antenna 112, 114, and 116, a receiving mobile terminal 124, a plurality of receiving antenna 132, 134, and 136, a plurality of RF channels 142, and a random noise source 140.

In operation, the transmitter 104 may transmit signals comprising symbols via the plurality of transmitting antennas 112, 114, and 116. An independent signal transmitted by the plurality of transmitting antennas 112, 114, and 116 may represent a spatial stream. A signal transmitted by the transmitter 104 may be considered independent if it comprises information that is unique compared to another signal transmitted by the transmitter 104, during an approximately simultaneous period of time. For a given number, NTX, of transmitting antennas 112, 114, and 116, the number of spatial streams, NSS, transmitted by the transmitter 104 may be greater than or equal to 1, and less than or equal to NTX. If NSS is equal to NTX, then each of the plurality of transmitting antennas 112, 114, and 116 may transmit independent signals during an approximately simultaneous period of time. If NSS is less than NTX, then at least one of the transmitting antennas 112, 114, and 116 may transmit information that is not independent of the information that is transmitted by at least one other of the transmitting antennas 112, 114, and 116 during an approximately simultaneous period of time.

The transmitter 104 may transmit a plurality of symbols $s_1$, $s_2$, and $s_3$, via corresponding transmitting antenna 112, 114, and 116 respectively. The symbols may be transmitted via an RF channel 142 where they may be subjected to scaling by a transfer function matrix, H, which is associated with transmission via the RF channel 142. A transfer function matrix of the RF channel 142, H, may be derived at the receiver 124 based on a channel estimate. Furthermore, random noise from the random noise source 140 may be added to the transmitted symbols. During communication with the transmitter 104, the receiver 124 may receive signals $y_1$, $y_2$, and $y_3$, via receiving antennas 132, 134, and 136 respectively, where at least one received signal comprises at least a portion of the symbols $s_1$, $s_2$, and $s_3$ that were transmitted by the transmitter 104. For example, given independent signals from the transmitting antennas 112, 114, and 116, the signal $y_1$ may be expressed:

$$y_1 = h_{11}s_1 + h_{12}s_2 + h_{13}s_3 + n_0 \qquad \text{equation[1]}$$

where $n_0$ may represent random noise introduced into the RF channel 142 by a random noise source 140, and $h_{ni}$ may represent a coefficient from the transfer function matrix H that is applied to a signal transmitted by transmitting antenna i and received by receiving antenna n.

Equation[1] may be generalized to express a relationship between a plurality of signals, S, transmitted by a transmitter 104, and a signal Y comprising a plurality of signals received by a receiver 124:

$$Y = HS + N \qquad \text{equation[2]}$$

where $Y = \{y_1, Y_2, \ldots Y_{NRX}\}$ may be represented as an NRXx1 (NRX rows, 1 column) matrix with NRX representing a number of receiving antenna, $S = \{x_1, x_2, \ldots x_{NSS}\}$ may be represented as an NSSx1 matrix, H may be represented as a NRXx-NTX matrix $\{\{h_{11}, h_{22}, \ldots h_{2,NTX}\} \{h_{NRX,1}, h_{32}, h_{NRX,NTX}\}\}$; and N may be represented as is a NRXx1 matrix $\{n_1, n_2, \ldots n_{NRX}\}$.

In the exemplary MIMO communications system illustrated in FIG. 1, the plurality of signals received by receiver 124 may comprise $Y = \{y_1, Y_2, y_3\}$, the plurality of signals transmitted by transmitter 104 may comprise $S = \{s_1, s_2, s_3\}$, the transfer function matrix of the RF channel 142 may comprise $H = \{\{h_{11}, h_{12}, h_{13}\} \{h_{21}, h_{22}, h_{23}\} \{h_{31}, h_{32}, h_{33}\}\}$; and the random noise source 140 may comprise $N = \{n_1, n_2, n_3\}$.

An estimate for the vector X from equation[2] may be computed based on the received signal vector Y as shown in the following equation:

$$X = WY \qquad \text{equation[3]}$$

where W may represent a matrix.

The matrix W from equation[3] may be computed by a linear equalization method. When utilizing zero forcing linear equalization (ZF-LE), the matrix W may be computed based on the transfer function matrix H as shown in the following equation:

$$W = \frac{1}{H^*H} H^* \qquad \text{equation [4]}$$

where H* may represent a complex conjugate transpose of the matrix H.

When utilizing minimum mean squared error linear equalization (MMSE-LE), the matrix W may be computed based on the transfer function matrix H, and a signal to noise ratio (SNR) based on the received signal vector Y and noise vector N, as shown in the following equation:

$$W = \frac{1}{\left(H^*H + \frac{1}{SNR}I\right)} H^* \qquad \text{equation [5]}$$

where I may represent an identity matrix.

The SNR may be computed based on the signal S, and a noise power, $\Omega$. The noise power may be computed as shown in the following equation:

$$\Omega = E\{(X-WY)(X-WY)^*\} \qquad \text{equation[6]}$$

and the corresponding SNR may be computed as shown in the following equation:

$$SNR = \frac{S}{\text{diag}(\Omega)} \qquad \text{equation [7]}$$

where diag(X) may represent the diagonal elements of the matrix X.

Figure 2A:
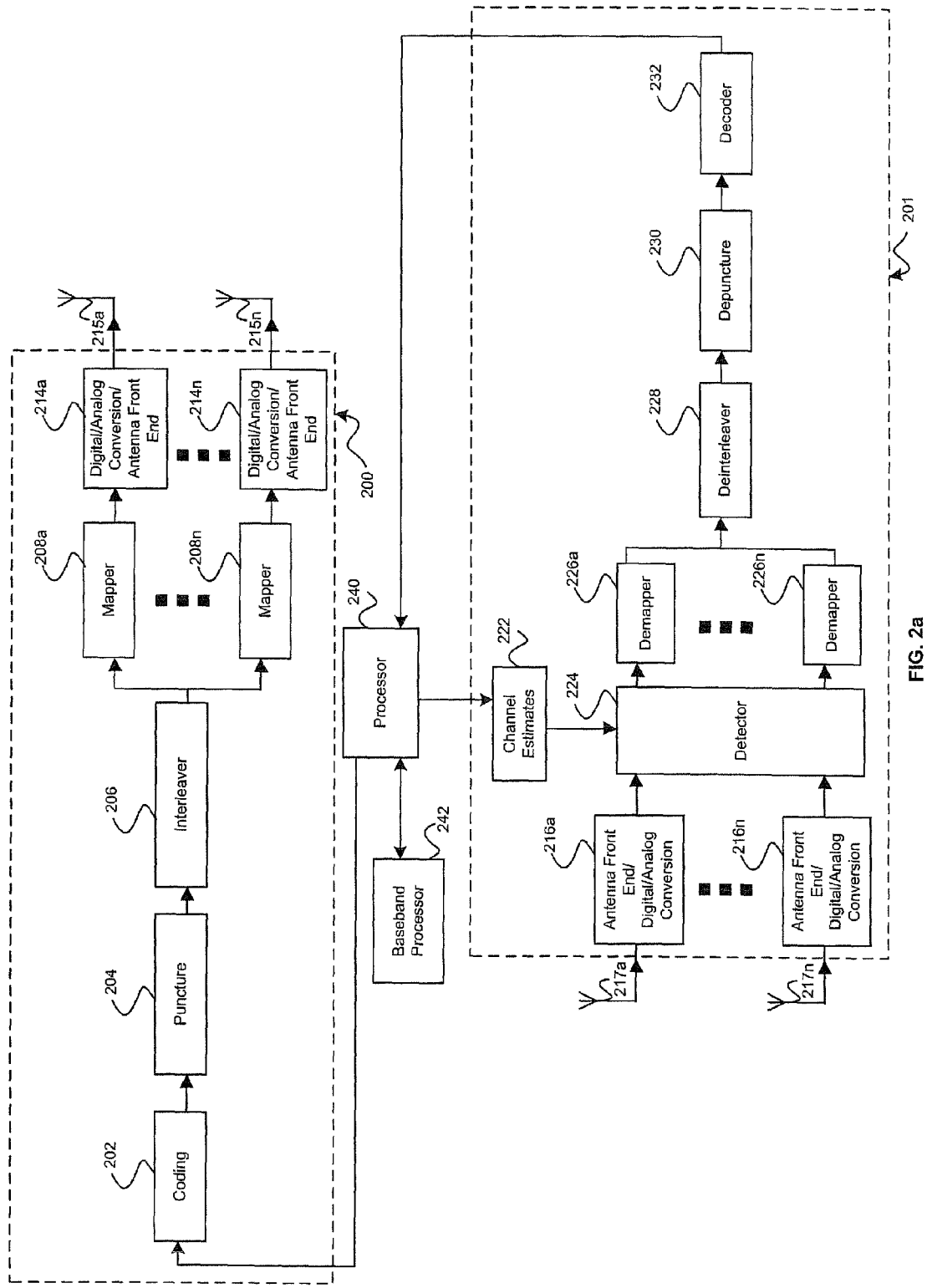
FIG. 2a is a block diagram of an exemplary MIMO transceiver system in accordance with an embodiment of the invention.

FIG. 2a is a block diagram of an exemplary MIMO transceiver system in accordance with an embodiment of the invention. Referring to FIG. 2a there is shown a transceiver comprising a transmitter 200, a receiver 201, a processor 240, a baseband processor 242, a plurality of transmitting antennas 215a . . . 215n, and a plurality of receiving antennas 217a . . . 217n. The transmitter 200 may comprise a coding block 202, a puncture block 204, an interleaver block 206, a plurality of mapper blocks 208a . . . 208n, and a plurality of digital to analog (D to A) conversion and antenna front end blocks 214a . . . 214n. The receiver 201 may comprise a plurality of antenna front end and analog to digital (A to D) conversion blocks 216a . . . 216n, a detector block 224, a plurality of demapper blocks 226a . . . 226n, a deinterleaver block 228, a depuncture block 230, and a decoder block 232.

The processor 240 may perform digital receiver and/or transmitter functions in accordance with applicable communications standards. These functions may comprise, but are not limited to, tasks performed at lower layers in a relevant protocol reference model. These tasks may further comprise physical layer convergence procedure (PLCP), physical medium dependent (PMD) functions, and associated layer management functions. The baseband processor 242 may similarly perform lower layer protocol functions in accordance with applicable communications standards. These functions may comprise, but are not limited to, tasks related to analysis of data received by the receiver 201, and tasks related to generating data to be transmitted by the transmitter 200. These tasks may further comprise medium access control (MAC) layer functions as specified by pertinent standards.

In the transmitter 200, the coding block 202 may transform received binary input data blocks by applying a forward error correction (FEC) technique, for example, binary convolutional coding (BCC). The application of FEC techniques, also known as "channel coding", may improve the ability to successfully recover transmitted data at a receiver by appending redundant information to the input data prior to transmission via an RF channel. The ratio of the number of bits in a binary input data block to the number of bits in a transformed data block may be known as the "coding rate". The coding rate may be specified using the notation $i_b/t_b$, where $t_b$ represents the total number of bits that may comprise a coding group of bits, while $i_b$ represents the number of information bits that may be contained in the group of bits $t_b$. Any number of bits $t_b-i_b$ may represent redundant bits that may enable the receiver 201 to detect and correct errors introduced during transmission. Increasing the number of redundant bits may enable greater capabilities at the receiver to detect and correct errors in information bits. The invention is not limited to BCC, and any one of a plurality of coding techniques, for example, Turbo coding or low density parity check (LDPC) coding, may also be utilized.

The puncture block 204 may receive transformed binary input data blocks from the coding block 202 and alter the coding rate by removing redundant bits from the received transformed binary input data blocks. For example, if the coding block 202 implemented a ½ coding rate, 4 bits of data received from the coding block 202 may comprise 2 information bits, and 2 redundant bits. By eliminating 1 of the redundant bits in the group of 4 bits, the puncture block 204 may adapt the coding rate from ½ to ⅔. The interleaver block 206 may rearrange bits received in a coding rate-adapted data block from the puncture block 204 prior to transmission via an RF channel to reduce the probability of uncorrectable corruption of data due to burst of errors, impacting contiguous bits, during transmission via an RF channel. The output from the interleaver block 206 may also be divided into a plurality of streams where each stream may comprise a non-overlapping portion of the bits from the received coding rate-adapted data block. Therefore, for a given number of bits in the coding rate-adapted data block, $b_{db}$, a given number of streams from the interleaver block 206, $n_{st}$, and a given number of bits assigned to an individual stream i by the interleaver block 206, $b_{st}(i)$:

$$b_{db} = \sum_{i=0}^{n_{st}-1} b_{st}(i) \quad \text{equation [8]}$$

For a given number of coded bits before interleaving, $b_{db}$, each bit may be denoted by an index, k=0, 1 ... $b_{db}$−1. The interleaver block 206 may assign bits to the first spatial stream, spatial stream 0, $b_{st}(0)$, for bit indexes k= 0, $n_{st}$, 2*$n_{st}$, ..., $b_{db}$−$n_{st}$. The interleaver block 206 may assign bits to spatial stream 1, $b_{st}(1)$, for bit indexes k=1, $n_{st}$+1, 2*$n_{st}$+1, ..., $b_{db}$−$n_{st}$+1. The interleaver block 206 may assign bits to spatial stream 2, $b_{st}(2)$, for bit indexes k=2, $n_{st}$+2, 2*$n_{st}$+2, $b_{db}$−$n_{st}$+2. The interleaver block 206 may assign bits to spatial stream $n_{st}$, $b_{st}(n_{st})$, for bit indexes k=$n_{st}$−1, 2*$n_{st}$−1, 3*$n_{st}$−1, ..., $b_{db}$−1.

The plurality of mapper blocks 208a ... 208n may comprise a number of individual mapper blocks that is equal to the number of individual streams generated by the interleaver block 206. Each individual mapper block 208a ... 208n may receive a plurality of bits from a corresponding individual stream, mapping those bits into a "symbol" by applying a modulation technique based on a "constellation" utilized to transform the plurality of bits into a signal level representing the symbol. The representation of the symbol may be a complex quantity comprising in-phase (I) and quadrature (Q) components. The mapper block 208a ... 208n for stream i may utilize a modulation technique to map a plurality of bits, $b_{st}(i)$, into a symbol.

The plurality of transmit filters, digital (D) to analog (A) conversion and antenna front end blocks 214a ... 214n may receive the plurality of signals generated by the plurality of mapper blocks 208a ... 208n. The digital signal representation received from each of the plurality of mapper blocks 208a ... 208n may be converted to an analog RF signal that may be amplified and transmitted via an antenna. The plurality of D to A conversion and antenna front end blocks 214a ... 214n may be equal to the number of transmitting antenna 215a ... 215n. Each D to A conversion and antenna front end blocks 214a ... 214n may utilize a corresponding one of antennas 215a ... 215n to transmit one RF signal via an RF channel.

In the receiver 201, the plurality of antenna front end, A to D conversion blocks and receive filters 216a ... 216n may receive analog RF signals via an antenna, converting the RF signal to baseband and generating a digital equivalent of the received analog baseband signal. The digital representation may be a complex quantity comprising I and Q components. The number of antenna front end and A to D conversion blocks 216a ... 216n may be equal to the number of receiving antenna 217a ... 217n.

The channel estimates block 222 may utilize preamble information, contained in a received RF signal, to compute channel estimates. The detector block 224 may receive signals generated by the plurality of antenna front end blocks 216a ... 216n. The detector block 224 may process the received signals based on input from the channel estimates block 222 to generate what may be referred to as a noisy symbol estimation of the symbol originally sent by the transmitter 200. The detector block 224 may comprise suitable logic, circuitry, and/or code that may be enable transformation of symbols received from the plurality of antenna front end blocks 216a ... 216n to compensate for fading in the RF channel.

The plurality of demapper blocks 226a ... 226n may receive detected symbols from the detector block 224. The plurality of demapper blocks 226a ... 226n may reverse map each detected symbol to one or more bits by applying a demodulation technique, based on the modulation technique utilized in generating the symbol at the transmitter 200. The values of the one or more bits may be determined based on soft bit information like log likelihood ratios (LLRs). The one or more bits, for which the corresponding values may be determined based on LLRs may be referred to as bit LLRs. A bit LLR may comprise soft bit information. Soft bit information may comprise a statistical estimation of the likelihood that the value of the bit LLR is equal to the value of the corresponding bit in a symbol originally sent by the transmitter 200. The plurality of demapper blocks 226a . . . 226n may be equal to the number of streams in the transmitter 200.

United States Application No. 16417US01 filed 2006 provides further description of soft bit information, which is hereby incorporated herein by reference in its entirety.

The deinterleaver block 228 may receive a plurality of bit LLRs from each of the demapper blocks 226a . . . 226n, rearranging the order of bits among the received plurality of bit LLRs. The deinterleaver block 228 may rearrange the order of bits from the plurality of demapper blocks 226a . . . 226n in, for example, the reverse order of that utilized by the interleaver 206 in the transmitter 200. The depuncture block 230 may insert "null" bits into the output data block received from the deinterleaver block 228 that were removed by the puncture block 204. The decoder block 232 may decode a depunctured output data block, applying a decoding technique that may recover the binary data blocks that were input to the coding block 202. The decoder block 232 may utilize soft bit information. Such a decoder may be referred to as a soft input decoder. When BCC encoding is utilized in the transmitter 200, the decoder block 232 may comprise a soft Viterbi decoder. When other encoding methods are utilized, for example Turbo coding or LDPC, the decoding block 232 may comprise a corresponding soft decoder method.

In operation, the detector 224 may perform statistical analysis on a received symbol. The received symbol may be estimated and mapped to a constellation point in a constellation based on a modulation type. Based on the statistical analysis, the detector 224 may generate soft information. The decoder 232 may utilize the soft information in decoding a plurality of bit LLRs received from the depuncture block 230. The decoder may determine a binary value for at least one of the plurality of binary bits received from the depuncture block 230.

The processor 240 may receive decoded data from the decoder 232. The processor 240 may communicate received data to the baseband processor 242 for analysis and further processing. The processor 240 may also communicate data received via the RF channel, by the receiver 201, to the channel estimates block 222. This information may be utilized by the channel estimates block 222, in the receiver 201, to compute channel estimates for a received RF channel. The baseband processor 242 may generate data to be transmitted via an RF channel by the transmitter 200. The baseband processor 242 may communicate the data to the processor 240. The processor 240 may generate a plurality of bits that are communicated to the coding block 202.

The elements shown in FIG. 2a may comprise components that may be present in an exemplary embodiment of a wireless communications terminal. One exemplary embodiment may be a wireless communications transmitter comprising a transmitter 200, a processor 240, and a baseband processor 242. Another exemplary embodiment may be a wireless communications receiver comprising a receiver 201, a processor 240, and a baseband processor 242. Another exemplary embodiment may be a wireless communications transceiver comprising a transmitter 200, a receiver 201, a processor 240, and a baseband processor 242.

Figure 2B:
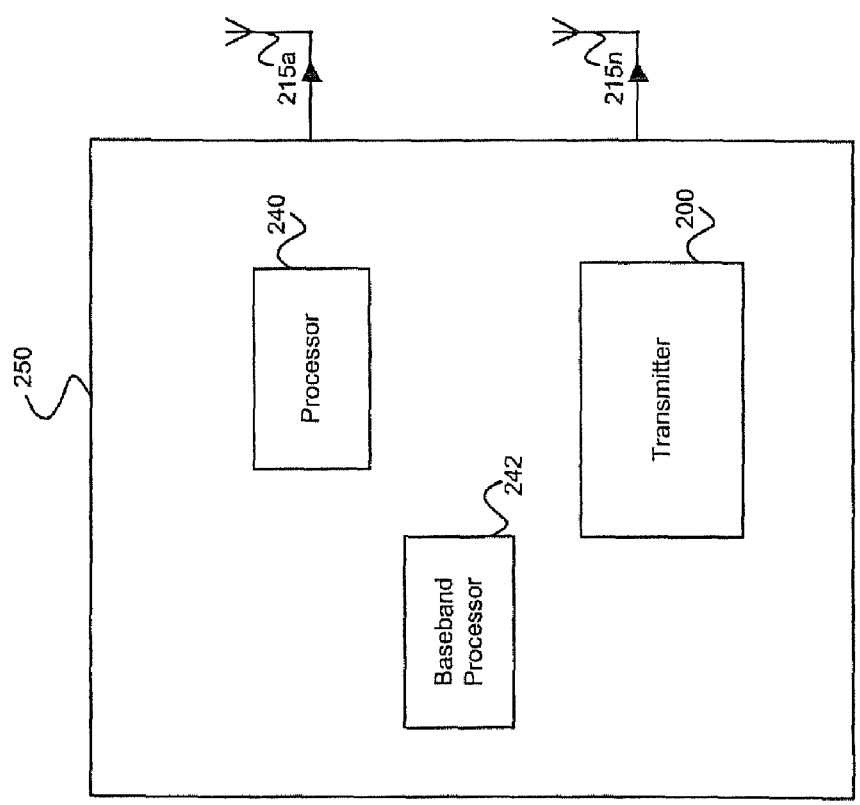
FIG. 2b is a block diagram of an exemplary wireless communications transmitter that may be utilized in connection with an embodiment of the invention.

FIG. 2b is a block diagram of an exemplary wireless communications transmitter that may be utilized in connection with an embodiment of the invention. With reference to FIG. 2b, there is shown a wireless communications transmitter 250. The wireless communications transmitter 250 may further comprise a processor 240, a baseband processor 242, and a plurality of transmitting antennas 215a . . . 215n. The processor 240, baseband processor 242, and plurality of transmitting antennas 215a . . . 215n, may be substantially as described in FIG. 2a.

Figure 2C:
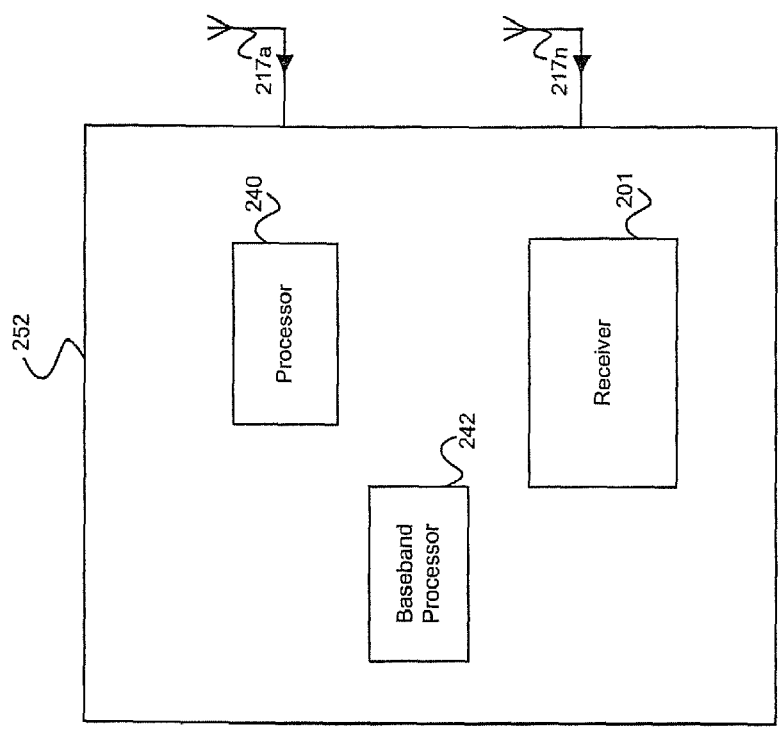
FIG. 2c is a block diagram of an exemplary wireless communications receiver that may be utilized in connection with an embodiment of the invention.

FIG. 2c is a block diagram of an exemplary wireless communications receiver that may be utilized in connection with an embodiment of the invention. With reference to FIG. 2c, there is shown a wireless communications receiver 252. The wireless communications receiver may further comprise a processor 240, a baseband processor 242, and a plurality of receiving antennas 217a . . . 217n. The processor 240, baseband processor 242, and plurality of receiving antennas 217a . . . 217n, may be substantially as described in FIG. 2a.

Figure 2D:
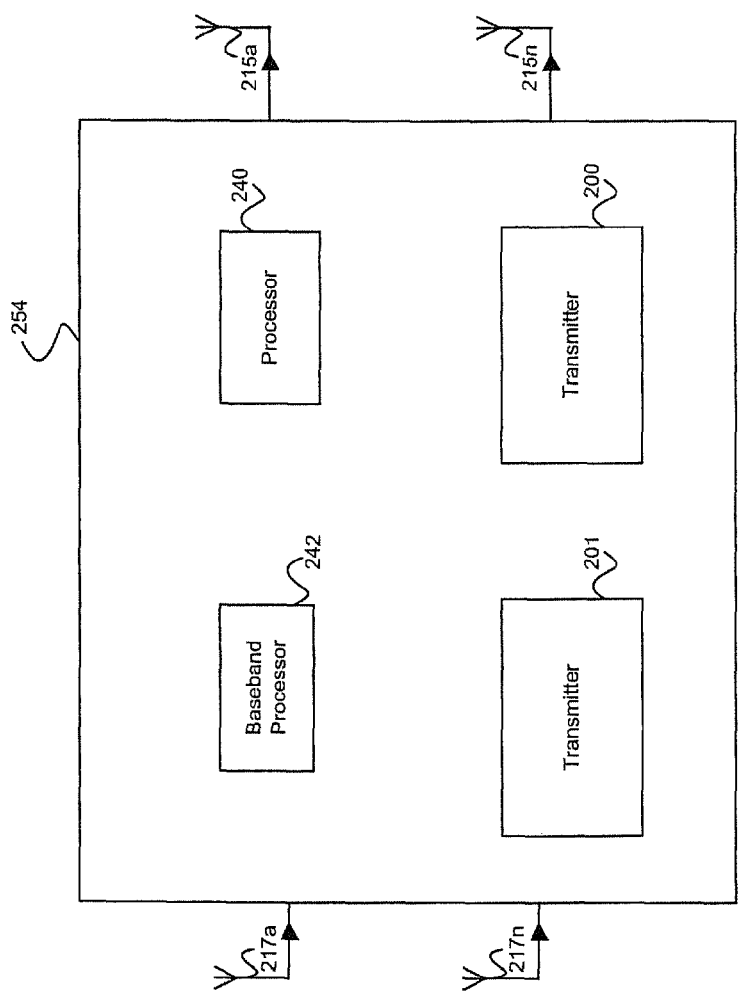
FIG. 2d is a block diagram of an exemplary wireless communications transceiver that may be utilized in connection with an embodiment of the invention.

FIG. 2d is a block diagram of an exemplary wireless communications transceiver that may be utilized in connection with an embodiment of the invention. With reference to FIG. 2d, there is shown a wireless communications transceiver 254. The wireless communications transceiver may further comprise a processor 240, a baseband processor 242, a plurality of transmitting antennas 215a . . . 215n, and a plurality of receiving antennas 217a . . . 217n. The processor 240, baseband processor 242, plurality of transmitting antennas 215a . . . 215n, and plurality of receiving antennas 217a . . . 217n may be substantially as described in FIG. 2a.

Various embodiments of the invention may comprise an adaptive VBLAST receiver. The adaptive VBLAST receiver may reduce the likelihood of error propagation from a current layer to a subsequent layer in comparison to conventional VBLAST receivers. Aspects of a system for an adaptive VBLAST receiver for wireless MIMO detection may comprise a receiver 124 that receives a signal wirelessly. The received signal may comprise a plurality of received symbols. The receiver 124 may selectively cancel an estimate of at least one of the plurality of received symbols in the received signal to generate a residual signal.

To calculate bit soft information, a likelihood that the value of an $i^{th}$ bit, in a symbol transmitted by an $n^{th}$ transmitting antenna 112, given received signal Y at the receiver 124, is equal to binary 1, may be defined as:

$$\log\left(\frac{P(x_{ni} = 1)}{P(x_{ni} = 0)}\right) \qquad \text{equation [9]}$$

where $x_{ni}$ may represent an $i^{th}$ bit, in a symbol transmitted by an $n^{th}$ transmitting antenna 112. An absolute value of the LLR as defined in equation[9], abs(LLR), may comprise a measure of the reliability with which a received bit, $x_{ni}$, was detected by the receiver 124. The received bit may be determined to have been reliably detected if the binary value of the received bit, $x_{ni}$, decoded from the estimated symbol, $\hat{s}_n$, that was derived from a layer associated with the received signal, Y, is equal to the binary value of the corresponding bit in the symbol, $s_n$, that was transmitted by a transmitter 104.

The estimated symbol resulting from detector processing, $\hat{s}_n$, may comprise a plurality of received bits, $x_{ni}$. Consequently, associated with the estimated symbol, $\hat{s}_n$, may be a plurality of $LLR_{ni}$ values, in accordance with equation[9], that correspond to the plurality of received bits, $x_{ni}$. A measure of the reliability with which the estimated symbol, $\hat{s}_n$, has been detected may be defined as:

$$R(\hat{s}_n) = \min_i(\text{abs}(LLR_{ni}))$$ equation [10]

where $R(\hat{s}_n)$ may represent a reliability parameter for the received symbol $\hat{s}_n$, and $LLR_{ni}$ may represent an LLR for the received bit $x_{ni}$. The expression $$\min_i(x_i)$$

may represent a minimum value $x_i$ among a plurality of values of $x_i$.

The MMSE associated with a transmitted symbol $s_n$, and a detected received symbol $\hat{s}_n$, may be represented as $\Lambda(\hat{s}_n, s_n)$. The $LLR_{ni}$ may be computed by evaluating the expression $\Lambda(\hat{s}_n, s_n)$ given a value of $x_{ni}=1$ and by evaluating the expression $\Lambda(\hat{s}_n, s_n)$ given a value of $x_{ni}=0$:

$$LLR_{ni} \approx \Lambda_{x_{ni}=1}(\hat{s}_n, s_n) - \Lambda_{x_{ni}=0}(\hat{s}_n, s_n)$$ equation [11]

where the expression $$\Lambda_{x_{ni}=1}(\hat{s}_n, s_n)$$

may represent the probability that the received bit $x_{ni}$, associated with a received symbol $\hat{s}_n$ that is a component of the received signal Y, comprises a binary value equal to 1 when the corresponding bit in the symbol, $s_n$, that was transmitted by a transmitter 104, also comprises a binary value equal to 1. The expression $$\Lambda_{x_{ni}=0}(\hat{s}_n, s_n)$$

may represent the probability that the received bit $x_{ni}$, associated with a received symbol $\hat{s}_n$ that is a component of the received signal Y, comprises a binary value equal to 0 when the corresponding bit in the symbol, $s_n$, that was transmitted by a transmitter 104, also comprises a binary value equal to 0.

Based on an assumption that the noise after linear equalization obeys a Gaussian distribution:

$$p(s_n | \hat{s}_n) = \frac{1}{\sqrt{2\pi N_0}} e^{-\frac{\|s_n - \hat{s}_n\|^2}{2N_0}}$$ equation [12]

where $N_0$ may represent a magnitude of random noise introduced by both AWGN and interference from other layers. The expression $\|A\|$ may represent a scalar magnitude of a vector A.

Thus, $\Lambda(\hat{s}_n, s_n)$ may be expressed as:

$$\Lambda(\hat{s}_n, s_n) = -\frac{1}{N_0}\|s_n - \hat{s}_n\|^2$$ equation [13]

Substituting the expression for $\Lambda(\hat{s}_n, s_n)$ from equation[13] into equation[11] may produce:

$$LLR_{ni} \approx \{-\|s_n - \hat{s}_n\|^2\}_{x_{ni}=1} - \{-\|s_n - \hat{s}_n\|^2\}_{x_{ni}=0}$$ equation[14]

where $\{X\}_{x=1}$ may represent the expression X evaluated for the value $x_{ni}=1$, and $\{X\}_{x=0}$ may represent the expression X evaluated for the value $x_{ni}=0$.

The first term on the right hand side of equation[14] may represent a minimum mean squared error (MMSE) associated with the received signal Y when $x_{ni}=1$. The second term on the right hand side of equation[14] may represent an MMSE associated with the received signal Y when $x_{ni}=0$. As such, equation[14] may express a difference between magnitudes of MMSEs. A magnitude MMSE may also be referred to as a magnitude, or as an MMSE. If the magnitude MMSE for a desired outcome, for example $x_{ni}=1$, is significantly less than the magnitude MMSE for an undesired outcome, for example $x_{ni}=0$, the value of the corresponding $LLR_{ni}$ may be large. A large $LLR_{ni}$ value may reflect a high degree of statistical confidence that a detected bit $x_{ni}=1$ at the receiver 124 comprises a value that is equal to the value of a corresponding bit transmitted by the transmitter 104. The $LLR_{ni}$ value generated by the detector 224 may be utilized by the decoder 232 to decode at least one binary bit $x_{ni}$ derived from the estimated symbol $\hat{s}_n$.

Various embodiments of the invention may comprise a receiver 201 that computes at least one magnitude comprising a numerical difference between at least one constellation point and at least one of a plurality of received symbols that may be associated with a received signal. The receiver 201 may compute at least one subsequent magnitude comprising a numerical difference between at least one subsequent constellation point and at least one of the plurality of received symbols. The receiver 201 may compute at least one log likelihood ratio according to a ratio based on a magnitude and a subsequent magnitude. The ratio may also be represented as a difference between a computed MMSE and a subsequent computed MMSE as shown in equation[14]. The receiver 201 may be integrated in the exemplary wireless communications receiver 252 of FIG. 2c and/or the exemplary wireless communications transceiver 254 of FIG. 2d.

The reliability parameter, $R(\hat{s}_n)$, which may comprise a minimum log likelihood ratio among the one or more computed log likelihood ratios, may be compared to a threshold value, for example a threshold value equal to about 5 (which roughly indicates the reliability of current bit is greater than 95%). The receiver 201 may be adapted to selectively cancel interference in a received signal based on the comparison between the value of the reliability parameter and the threshold value. For example, the receiver may selectively cancel interference in the received signal when the value of the reliability parameter is greater than or equal to the threshold value. The selective cancellation of interference associated with a layer, as represented by the estimated symbol $\hat{s}_n$, from a received signal based on the reliability parameter $R(\hat{s}_n)$ may be referred to as adaptive cancellation.

In various embodiments of the invention, each layer associated with the received signal may be evaluated for adaptive cancellation. The evaluation may utilize soft bit information. Subsequent to the adaptive cancellation in a current layer, a current residual signal may be generated. Subsequent to a final adaptive cancellation a final residual signal may be generated. The receiver 201 may compute an estimated value for at least one of the plurality of received symbols that may be determined based on the final residual signal when the final residual signal comprises a value that is statistically greater than 0.

In some conventional VBLAST receivers, the cancellation of a layer, as represented by the estimated symbol $\hat{s}_n$, from a received signal Y may be performed unconditionally. A drawback associated with this approach is that errors, which may be represented as a magnitude difference between the value of the estimated symbol $\hat{s}_n$ and the transmitted symbol $s_n$, may be propagated from a current layer to a subsequent layer. The result may be degraded packet error rates (PER) in comparision to a non-cancellation linear equalization based solution (like MMSE-LE). In various embodiments of the invention, the cancellation of a layer in the received signal Y may be performed only if the corresponding value of the corresponding reliability parameter $R(\hat{s}_n)$ of that layer is greater than or equal to a threshold value.

Figure 3:
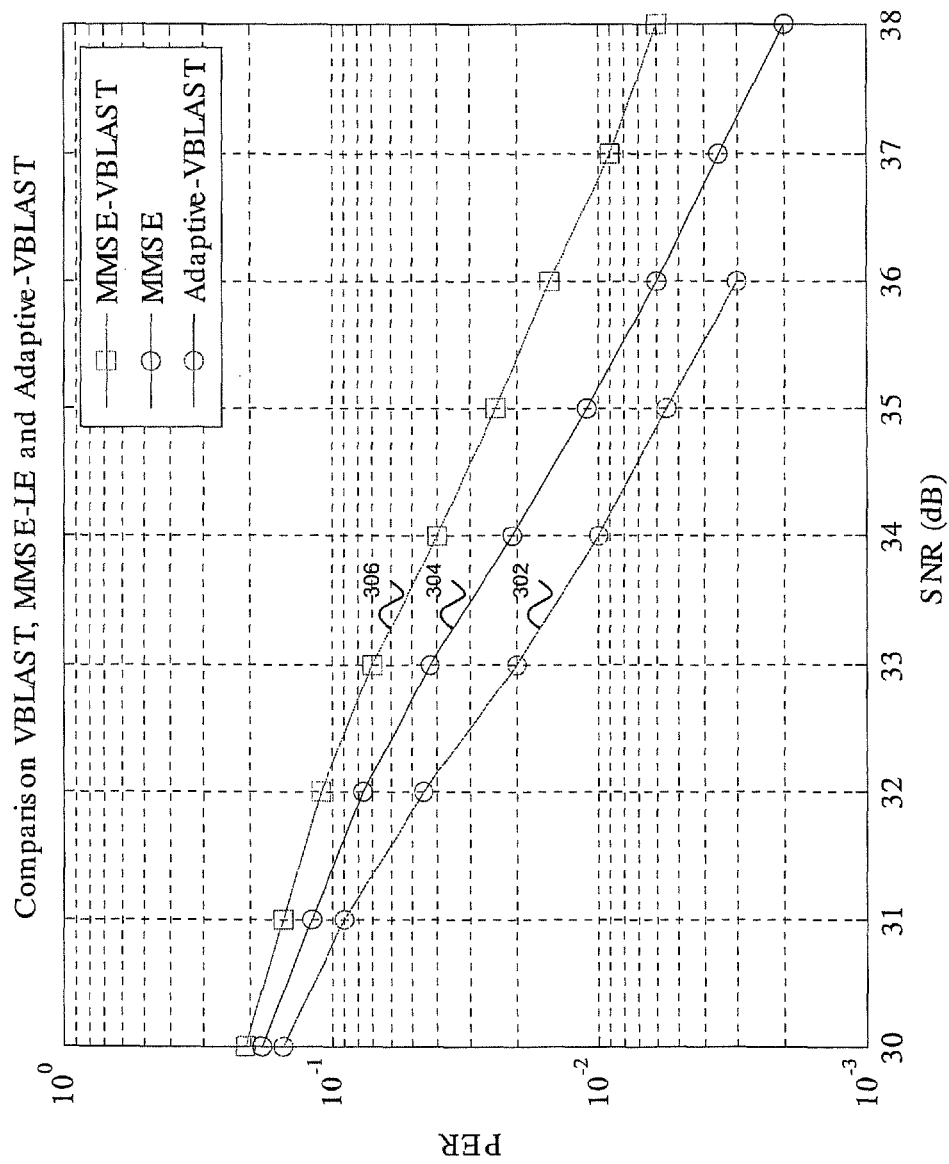
FIG. 3 is a graph illustrating exemplary comparative results from simulation of a system for adaptive VBLAST, a system for MMSE estimation, and a system for MMSE-VBLAST, in accordance with an embodiment of the invention.

FIG. 3 is a graph illustrating exemplary comparative results from simulation of a system for adaptive VBLAST, a system for MMSE linear detection (MMSE-LE), and a system for MMSE-VBLAST, in accordance with an embodiment of the invention. Referring to FIG. 3, there is shown a simulation result for an adaptive VBLAST receiver based on an embodiment of the invention 302, a simulation result based on an MMSE receiver 304, and a simulation result based on a conventional VBLAST receiver 306.

The graphs 302, 304, and 306, shown in FIG. 3, may represent simulation results illustrating packet error rates (PER) at various signal to noise ratio (SNR) levels in an 802.11n wireless local area network (WLAN) MIMO communications system. The simulation model may be as specified for IEEE 802.11n, comprising a MIMO fading channel with a specified delay spread. The simulation may comprise a nondirect line of sight fading RF channel between the transmitter 200 and the receiver 201. Consequently, a transmitted signal may encounter multiple reflections, within the RF channel, when traveling through a wireless communications medium between the transmitter 200 and the receiver 201. A transmitted signal may comprise symbols that are generated utilizing 64 quadrature amplitude modulation (QAM) modulation type for each spatial stream. A binary convolutional code may be utilized that comprises a coding rate of ⅚. The adaptive VBLAST and conventional VBLAST simulations may sort layers based on SNR after every cancellation in order to determine the next layer to process. The adaptive VBLAST simulation may utilize a threshold value equal to about 5.

The adaptive VBLAST graph 302 indicates that various embodiments of the invention may achieve a lower PER at a given SNR than is shown for the MMSE simulation 304, or the conventional VBLAST simulation 306. For example, for SNR=36 dB, graph 302 indicates a PER of about 0.003, or about 0.3%. For SNR=36 dB, graph 304 indicates a PER of about 0.006, or about 0.6%, while graph 306 indicates a PER of about 0.015, or about 1.5%.

The adaptive VBLAST graph 302 also indicates that various embodiments of the invention may achieve a given PER at a lower SNR, than is shown for the MMSE simulation 304, or the conventional VBLAST simulation 306. For example, for PER=0.01, graph 302 indicates that various embodiments of the invention may achieve this PER performance level at an SNR level of about 34 dB. For PER=0.01, graph 304 indicates an SNR level of about 35 dB, while graph 306 indicates an SNR level of about 37 dB.

Figure 4:
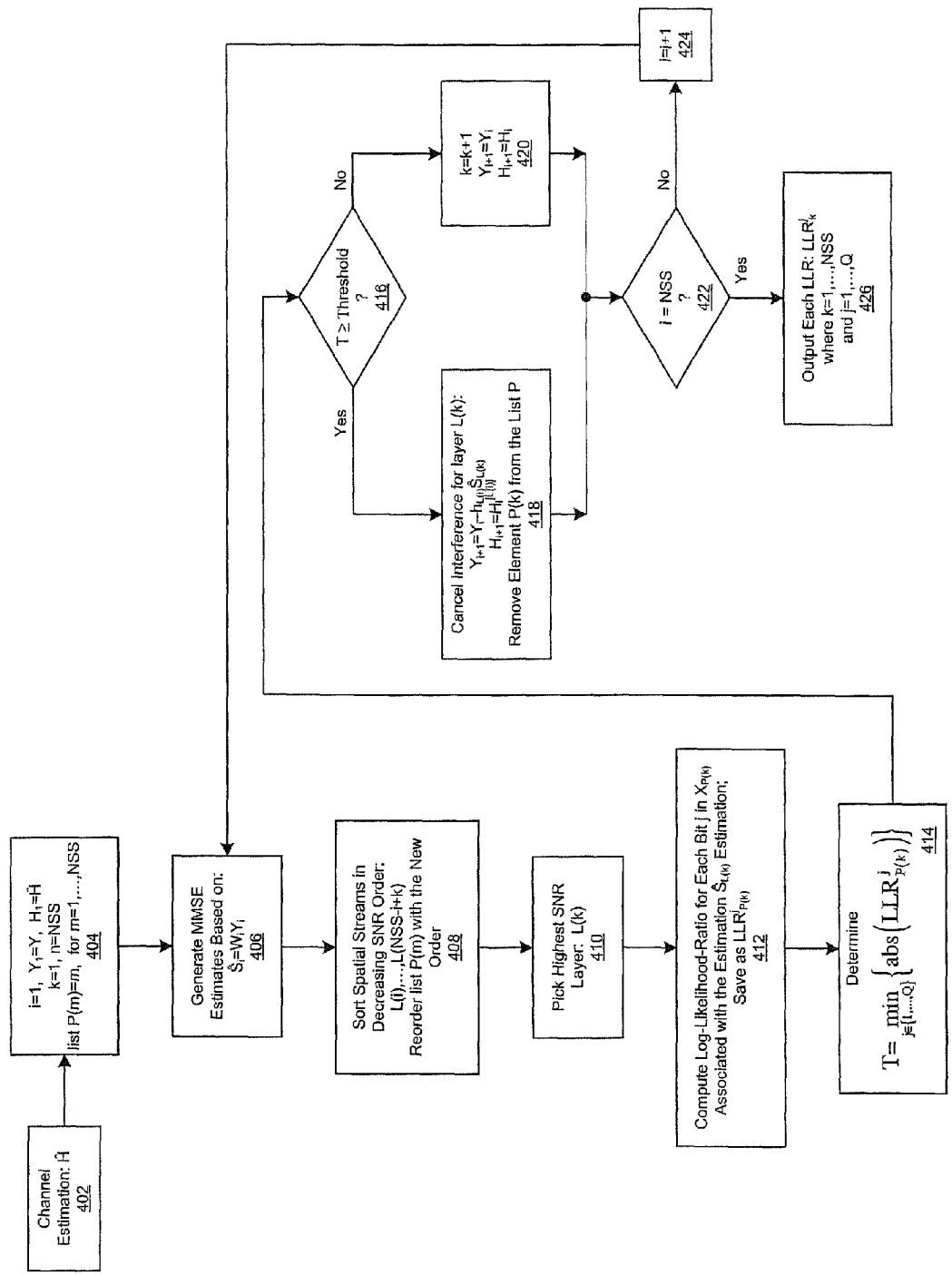
FIG. 4 is a flow chart illustrating exemplary steps in a system for adaptive VBLAST in accordance with an embodiment of the invention.

FIG. 4 is a flow chart illustrating exemplary steps in a system for adaptive VBLAST in accordance with an embodiment of the invention. Referring to FIG. 4, in step 402, a channel estimation, $\hat{H}$, may be computed. In step 404, a plurality of variable may be initialized. The layer index, i, may indicate a current layer, and may be initialized i=1 to indicate a first layer. The variable Y may refer to a received signal. The signal variable $Y_1$ may refer to a layer 1 signal, and may be initialized $Y_1$=Y. The initialization value for the signal variable $Y_1$ may indicate that, at initialization, no layers have been cancelled from the received signal. Consequently, the layer 1 signal variable, $Y_1$, may be equal to the received signal Y. The received signal Y may be represented as a column vector Y.

A layer channel estimation, $\hat{H}_1$, may refer to a channel estimate associated with the first layer, and may be initialized $\hat{H}_1 = \hat{H}$ where $\hat{H}$ may represent the computed channel estimation from step 402. A list index, k, may indicate a current layer from an ordered list of layer indexes, and may be initialized k=1 to indicate a layer that may be referenced by a first element in an ordered list of layer indexes. An ordered list of layer indexes, P(m), may be initialized P(m)=m, to indicate that the ordered list may be initially sorted in numerical order according to the indexes. The variable m may represent a layer counter that may comprise a range of values from 1 to NSS, where NSS may represent a total number of layers utilized in a MIMO transmitting and/or receiving system.

In step 406, an MMSE estimation, $\hat{S}_i$, may be generated based on the column vector Y and on a channel estimation, where $\hat{H}_i$ may represent a channel estimation computed for an $i^{th}$ layer. The MMSE estimation may be represented, $\hat{S}_i = W_i Y_i$, where the variable i may represent the current value for the layer index, and the variable $W_i$ may be computed from the MMSE equalization equation[5] for the layer i. The MMSE estimation $\hat{S}_i$ may be represented by a column vector. The column vector $\hat{S}_i$ may comprise a plurality of layers. L(1), L(2), . . . , L(NSS−i+k) corresponding to a plurality of layers associated with transmitting antennas 112, 114, . . . , 116, for example.

In step 408, the spatial streams associated with the column vector $\hat{S}_i$ may be sorted according to a corresponding signal to noise ratio (SNR) value. For example, the spatial streams may be sorted in order of decreasing SNR value. The total number of layers sorted may be adjusted based on the layer index i, which may indicate a current layer, and on the list index, k, which may indicate a number of layers that have not been cancelled from the received signal Y. The ordered list of layered indexes, P(m), may be correspondingly reordered based upon the sorting of layers based on SNR values.

In step 410, the layer indicated by L(k) may be selected, where L(k) may represent the $k^{th}$ layer in the sorted list of layers from step 408. The layer indicated by L(k) may represent the layer associated with the highest SNR value in the sorted list of layers.

In step 412, a log likelihood ratio may be computed for each bit, j, in a bit vector $X_{P(k)}$ that may be associated with an estimation value for a received symbol, $\hat{S}_{L(k)}$. The estimation value $\hat{S}_{L(k)}$, computed in step 406, may indicate an estimate of a signal received in connection with a layer as indicated by L(k). The received symbol may be mapped to a constellation based on a modulation type utilized when transmitting the symbol. Based on the constellation map, the estimated symbol, $\hat{S}_{L(k)}$, may be represented by a plurality of bits in a bit vector, $X_{P(k)}$, associated with a layer as indicated by P(k). The bit vector may comprise a plurality of Q bits, where the number of bits Q may be based on the modulation type associated with the corresponding symbol. The bit index j may indicate an individual bit within the bit vector. The bit index j may comprise a range of values from 1 to Q. The computed value for the log likelihood ratio associated with a bit j in the bit vector $X_{P(k)}$, may be represented $LLR^j_{P(k)}$. A computed value $LLR^j_{P(k)}$ may be stored for each bit in connection with the bit vector $X_{P(k)}$. The number of computed values $LLR^j_{P(k)}$ may be equal to Q.

In step 414, absolute values for $LLR^j_{P(k)}$ may be computed for each bit in connection with the bit vector $X_{P(k)}$, where each bit may be indicated by j=1, j=2, ... j=Q. A minimum value among the Q values of $LLR^j_{P(k)}$ may be determined. The minimum value may be stored as represented by the temporary variable, T.

Step 416 may determine whether the value T is greater than a threshold value. When the value T is be greater than the threshold value, it may indicate that there may be higher probability that the estimated value of the received symbol, $\hat{S}_{L(k)}$, represents the true value of the corresponding transmitted symbol than may be the case for values of T that do not exceed the threshold value. If step 416 determines that the value T may not be greater than the threshold value, in step 418, the estimated symbol may be utilized to cancel interference associated with the layer as indicated by L(k). The estimated symbol may be utilized to cancellation from the signal variable, $Y_i$, which may represent a signal associated with the $i^{th}$ layer. As a result, a signal variable associated with an $(i+1)^{th}$ layer, $Y_{i+1}$, may be computed. Also in step 418, a layer channel estimation associated with an $(i+1)^{th}$ layer, $\hat{H}_{i+1}$, may be computed by removing a column, as indicated by L(k), from the layer channel estimation matrix associated with the $i^{th}$ layer, $\hat{H}_i$. Furthermore, a $k^{th}$ element, P(k), from the ordered list of layer indexes may be removed.

If step 416 determines that the value T may not be greater than the threshold value, in step 420, the list index, k, may be incremented. This may provide an indication that a layer has not been removed. Step 422, which may follow step 418 or step 420, may determine whether the current layer, as indicated by the layer index i, is equal to the total number of layers, NSS. If step 422 determines that the current layer is not equal to NSS, in step 424, the layer index, i, may be incremented. Step 406 may follow step 424.

If step 422 determines that the current layer is equal to NSS, it may indicate that the current layer is the last layer, and that processing of layers has been completed. In step 426, each of the computed values $LLR^j_{P(k)}$, associated with each of the NSS layers, and with each of the Q bits in each layer, may be output.

Various embodiments of a system for processing received information in a communication system may comprise a receiver 201 that wirelessly receives a signal comprising a plurality of received symbols, and selectively cancels an estimate of one or more received symbols in the received signal to generate a residual signal. The system may further comprise one or more processors such as processor 240 that may compute a magnitude comprising a numerical difference between a constellation point and the one or more received symbols. The constellation point may be determined based on a modulation type. The processor 240 may compute at least one subsequent magnitude comprising a numerical difference between a subsequent constellation point and one or more received symbols. The numerical difference may comprise a Euclidean distance.

The processor 240 may compute a log likelihood ratio according to a ratio based on the magnitude and the subsequent magnitude. A minimum log likelihood ratio of the computed log likelihood ratio may be computed by the processor 240. The processor 240 may then compare the computed minimum log likelihood ratio to a threshold value. Based on a result of the comparison, the processor 240 may be adapted to perform a selective cancellation. The processor 240 may compute a final occurrence of a residual signal subsequent to a final occurrence of the selective canceling. An estimated value of at least one of the plurality of received symbols may be computed by the processor 240 when the final occurrence of the residual signal comprises a value that is statistically greater than about 0.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing received signals in a communication system, the method comprising:
    computing a plurality of stream signals based on one or more received signals and a equalization matrix;
    computing an indication value based on a selected one of said plurality of stream signals;
    comparing said indication value to a threshold value;
    computing a residual signal based on said comparing;
    computing a plurality of bit estimation values based on said residual signal; and
    identifying a received symbol that corresponds to said selected one of said plurality of stream signals.

2. The method according to claim 1, comprising computing said equalization matrix based on a channel estimate matrix.

3. The method according to claim 2, comprising computing said channel estimate matrix based on said one or more received signals.

4. The method according to claim 1, comprising computing a signal to noise ratio value for each of said plurality of stream signals.

5. The method according to claim 4, comprising selecting one of said plurality of stream signals based on said plurality of signal to noise ratio values.

6. The method according to claim 5, comprising selecting said one of said plurality of stream signals based on a maximum value among said plurality of signal to noise ratios.

7. The method according to claim 1, comprising computing an estimation value for each of a plurality of bits that correspond to said received symbol.

8. The method according to claim 7, wherein said estimation value is based on a log-likelihood ratio value.

9. The method according to claim 7, comprising computing said indication value for said plurality of bits based on said computed plurality of estimation values.

10. The method according to claim 9, comprising computing an interference signal based on said received symbol and a corresponding channel estimation vector.

11. The method according to claim 10, comprising computing said residual signal based on said one or more received signals and said interference signal when said indication value is not less than said threshold value.

12. The method according to claim 10, wherein a channel estimate matrix comprises said corresponding channel estimation vector.

13. The method according to claim 12, comprising computing a residual channel estimate matrix by removing said corresponding channel estimation vector from said channel estimate matrix.

14. The method according to claim 13, comprising computing a subsequent plurality of stream signals based on said residual signal, said residual channel estimate matrix and a residual plurality of stream signals.

15. The method according to claim 14, comprising computing said residual plurality of stream signals by removing said selected one of said plurality of stream signals from said plurality of stream signals.

16. The method according to claim 1, wherein said plurality of bit estimation values are based on a corresponding plurality of log-likelihood ratio values.

17. A system for processing received signals in a communication system, the system comprising:
one or more circuits that enable computation of a plurality of stream signals based on one or more received signals and a equalization matrix;
said one or more circuits enable computation of an indication value based on a selected one of said plurality of stream signals;
said one or more circuits enable comparison of said indication value to a threshold value;
said one or more circuits enable computation of a residual signal based on said comparing;
said one or more circuits enable computation of a plurality of bit estimation values based on said residual signal; and
wherein said one or more circuits enable identification of a received symbol that corresponds to said selected one of said plurality of stream signals.

18. The system according to claim 17, wherein said one or more circuits enable computation of said equalization matrix based on a channel estimate matrix.

19. The system according to claim 18, wherein said one or more circuits enable computation of said channel estimate matrix based on said one or more received signals.

20. The system according to claim 17, wherein said one or more circuits enable computation of a signal to noise ratio value for each of said plurality of stream signals.

21. The system according to claim 20, wherein said one or more circuits enable selection of one of said plurality of stream signals based on said plurality of signal to noise ratio values.

22. The system according to claim 17, wherein said one or more circuits enable selection of said one of said plurality of stream signals based on a maximum value among said plurality of signal to noise ratios.

23. The system according to claim 17, wherein said one or more circuits enable computation of an estimation value for each of a plurality of bits that correspond to said received symbol.

24. The system according to claim 23, wherein said estimation value is based on a log-likelihood ratio value.

25. The system according to claim 23, wherein said one or more circuits enable computation of said indication value for said plurality of bits based on said computed plurality of estimation values.

26. The system according to claim 25, wherein said one or more circuits enable computation of an interference signal based on said received symbol and a corresponding channel estimation vector.

27. The system according to claim 26, wherein said one or more circuits enable computation of said residual signal based on said one or more received signals and said interference signal when said indication value is not less than said threshold value.

28. The system according to claim 26, wherein a channel estimate matrix comprises said corresponding channel estimation vector.

29. The system according to claim 28, wherein said one or more circuits enable computation of a residual channel estimate matrix by removing said corresponding channel estimation vector from said channel estimate matrix.

30. The system according to claim 29, wherein said one or more circuits enable computation of a subsequent plurality of stream signals based on said residual signal, said residual channel estimate matrix and a residual plurality of stream signals.

31. The system according to claim 30, wherein said one or more circuits enable computation of said residual plurality of stream signals by removing said selected one of said plurality of stream signals from said plurality of stream signals.

32. The system according to claim 17, wherein said plurality of bit estimation values are based on a corresponding plurality of log-likelihood ratio values.

* * * * *

UNITED STATES PATENT AND TRADEMARK OFFICE
CERTIFICATE OF CORRECTION

| | | |
|---|---|---|
| PATENT NO. | : 8,300,747 B2 | Page 1 of 1 |
| APPLICATION NO. | : 12/763670 | |
| DATED | : October 30, 2012 | |
| INVENTOR(S) | : Ling Su | |

It is certified that error appears in the above-identified patent and that said Letters Patent is hereby corrected as shown below:

Title Page, item (54) and in the specification, column 1, lines 1-4, the title should read "METHOD AND SYSTEM FOR AN ADAPTIVE VBLAST RECEIVER FOR WIRELESS MULTIPLE INPUT MULTIPLE OUTPUT (MIMO) DETECTION"

Signed and Sealed this
First Day of October, 2013

Teresa Stanek Rea
*Deputy Director of the United States Patent and Trademark Office*